(12) United States Patent
Pedder et al.

(10) Patent No.: US 11,768,376 B1
(45) Date of Patent: Sep. 26, 2023

(54) HEAD-MOUNTED DISPLAY SYSTEM WITH DISPLAY AND ADJUSTABLE OPTICAL COMPONENTS

(71) Applicant: Apple Inc., Cupertino, CA (US)

(72) Inventors: James E. Pedder, Oxford (GB); James H. Foster, Oxford (GB); Julian Hoening, San Francisco, CA (US); Julian Jaede, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 15/815,563

(22) Filed: Nov. 16, 2017

Related U.S. Application Data

(60) Provisional application No. 62/424,683, filed on Nov. 21, 2016.

(51) Int. Cl.
| | |
|---|---|
| *G02B 27/01* | (2006.01) |
| *G02B 27/00* | (2006.01) |
| *G06T 19/00* | (2011.01) |
| *G09G 3/20* | (2006.01) |
| *G02F 1/01* | (2006.01) |

(52) U.S. Cl.
CPC ..... *G02B 27/0172* (2013.01); *G02B 27/0068* (2013.01); *G02B 27/0179* (2013.01); *G06T 19/006* (2013.01); *G09G 3/2003* (2013.01); *G02B 2027/014* (2013.01); *G02B 2027/0112* (2013.01); *G02B 2027/0138* (2013.01); *G02B 2027/0185* (2013.01); *G02F 1/0136* (2013.01); *G09G 2320/0242* (2013.01); *G09G 2320/0693* (2013.01)

(58) Field of Classification Search
CPC .............. G02B 27/017; G02B 27/0172; G02B 27/0174; G02B 27/0178; G02B 27/0181;
(Continued)

(56) References Cited

U.S. PATENT DOCUMENTS

| | | | | |
|---|---|---|---|---|
| 5,172,146 A | * | 12/1992 | Wooldridge | G03B 7/18 396/209 |
| 5,343,313 A | * | 8/1994 | Fergason | A61F 9/023 2/6.3 |

(Continued)

FOREIGN PATENT DOCUMENTS

| | | |
|---|---|---|
| WO | 2013155217 | 10/2013 |
| WO | 2016014234 | 1/2016 |
| WO | 2016014873 | 1/2016 |

OTHER PUBLICATIONS

Miaimone et al., Computational Augmented Reality Eyeglasses, Department of Computer Science, University of North Carolina at Chapel Hill, 2013.

*Primary Examiner* — Ke Xiao
*Assistant Examiner* — Nelson Lam
(74) *Attorney, Agent, or Firm* — Treyz Law Group, P.C.; G. Victor Treyz; Kendall P. Woodruff

(57) ABSTRACT

An electronic device such as a head-mounted display or other display system may have a transparent display. The transparent display may be formed from a transparent display panel or a display device that provides images to a transparent optical coupler. A user may view real-world objects through the transparent display. Control circuitry can direct the transparent display to display computer-generated content over selected portions of the real-world objects. The head-mounted display may have adjustable components through which the user may view the real-world objects. The adjustable components may include an adjustable light modulator, an adjustable color filter, and an adjustable polarizer. The control circuitry may adjust these components based on information from a front-facing camera that captures images of the real-world objects, based on information from a gaze tracking camera, and based on other input.

14 Claims, 13 Drawing Sheets

(58) Field of Classification Search
CPC ............... G02B 27/0068; G02B 27/01; G02B 27/0101; G02B 27/0112; G02B 27/0179; G02B 2027/0138; G02B 2320/0242; G06T 19/006; G09G 3/2003; G09G 3/2007
USPC ....................................................... 345/7–9
See application file for complete search history.

(56) References Cited

U.S. PATENT DOCUMENTS

| | | | |
|---|---|---|---|
| 5,841,507 A * | 11/1998 | Barnes | G02C 7/104 |
| | | | 351/49 |
| 6,760,080 B1 | 7/2004 | Moddel et al. | |
| 8,890,771 B2 | 11/2014 | Pance | |
| 2005/0179846 A1* | 8/2005 | Lee | G02F 1/133512 |
| | | | 349/141 |
| 2011/0222157 A1* | 9/2011 | Sano | G01J 3/26 |
| | | | 359/578 |
| 2012/0113092 A1 | 5/2012 | Bar-Zeev et al. | |
| 2014/0132484 A1* | 5/2014 | Pandey | G06T 19/006 |
| | | | 345/8 |
| 2015/0015460 A1* | 1/2015 | Kobayashi | G02B 27/017 |
| | | | 345/8 |
| 2015/0187115 A1* | 7/2015 | MacDonald | G06F 3/013 |
| | | | 345/419 |
| 2016/0171779 A1* | 6/2016 | Bar-Zeev | G02B 26/026 |
| | | | 345/592 |
| 2016/0309132 A1* | 10/2016 | Yao | G06T 7/90 |
| 2017/0034493 A1* | 2/2017 | Wang | H04N 23/88 |
| 2017/0090194 A1* | 3/2017 | Hayes | G02B 27/0101 |
| 2017/0116459 A1* | 4/2017 | Chen | G06K 9/00604 |

* cited by examiner

HEAD-MOUNTED DISPLAY SYSTEM WITH DISPLAY AND ADJUSTABLE OPTICAL COMPONENTS

This application claims the benefit of provisional patent application No. 62/424,683, filed Nov. 21, 2016, which is hereby incorporated by reference herein in its entirety.

BACKGROUND

This relates generally to devices with displays, and, more particularly, to head-mounted displays.

Head-mounted displays may be used to display virtual reality and augmented reality content. A head-mounted display that is displaying augmented reality content may overlay computer-generated images on real-world objects. If care is not taken, the computer-generated images may be difficult to see against the real-world objects, real-world objects may distract a viewer, issues with the colors associated with certain content may make content difficult to view, or other issues may arise with displayed content.

SUMMARY

An electronic device such as a head-mounted display or other display system may have a transparent display. The transparent display may be formed from a transparent display panel or a non-transparent display panel that provides images to a user through an optical coupler. A user may view real-world objects through the transparent display while control circuitry directs the transparent display to display computer-generated content over selected portions of the real-world objects. Tunable lenses and other optical systems may be provided in the transparent display or other portions of the head-mounted display so that displayed images may be placed at multiple different focal planes within a user's field of view.

The head-mounted display may have adjustable components that overlap the transparent display. The user may view the real-world objects through the adjustable components. The adjustable components may include an adjustable light modulator, an adjustable color filter, and an adjustable polarizer. These components may have individually adjustable portions. The control circuitry may adjust the adjustable components based on information from a front-facing camera that captures images of the real-world objects, based on information from a gaze tracking camera, based on information from an orientation sensor, based on ambient light information, based on other information on the environment surrounding the head-mounted display, based on location, based on user input, and based on other input.

The control circuitry may adjust the adjustable components to block glare from particular portions of the user's field of view, to highlight objects of interest such as electronic device display screens and other interesting objects while blocking distracting portions of the user's field of view, to correct white balance, to impart a color cast that aids users in reading text, and to perform other functions.

DETAILED DESCRIPTION

Head-mounted displays and other devices may be used for virtual reality and augmented reality systems. These devices may include portable consumer electronics (e.g., portable electronic devices such as cellular telephones, tablet computers, glasses, other wearable equipment), head-up displays in cockpits, vehicles, etc., display-based equipment (projectors, televisions, etc.). Devices such as these may include transparent displays and other optical components. Device configurations in which virtual reality and/or augmented reality content is provided to a user with a head-mounted display are described herein as an example. This is, however, merely illustrative. Any suitable equipment may be used in providing a user with virtual reality and/or augmented reality content.

A head-mounted display such as a pair of augmented reality glasses that is worn on the head of a user may be used to provide a user with computer-generated content that is overlaid on top of real-world content. The real-world content may be viewed directly by a user (e.g., by observing real-world objects through a transparent display panel or through an optical coupler in a transparent display system that merges light from real-world objects with light from a display panel). Configurations in which images or real-world objects are captured by a forward-facing camera and displayed for a user on a display may also be used.

Figure 1:
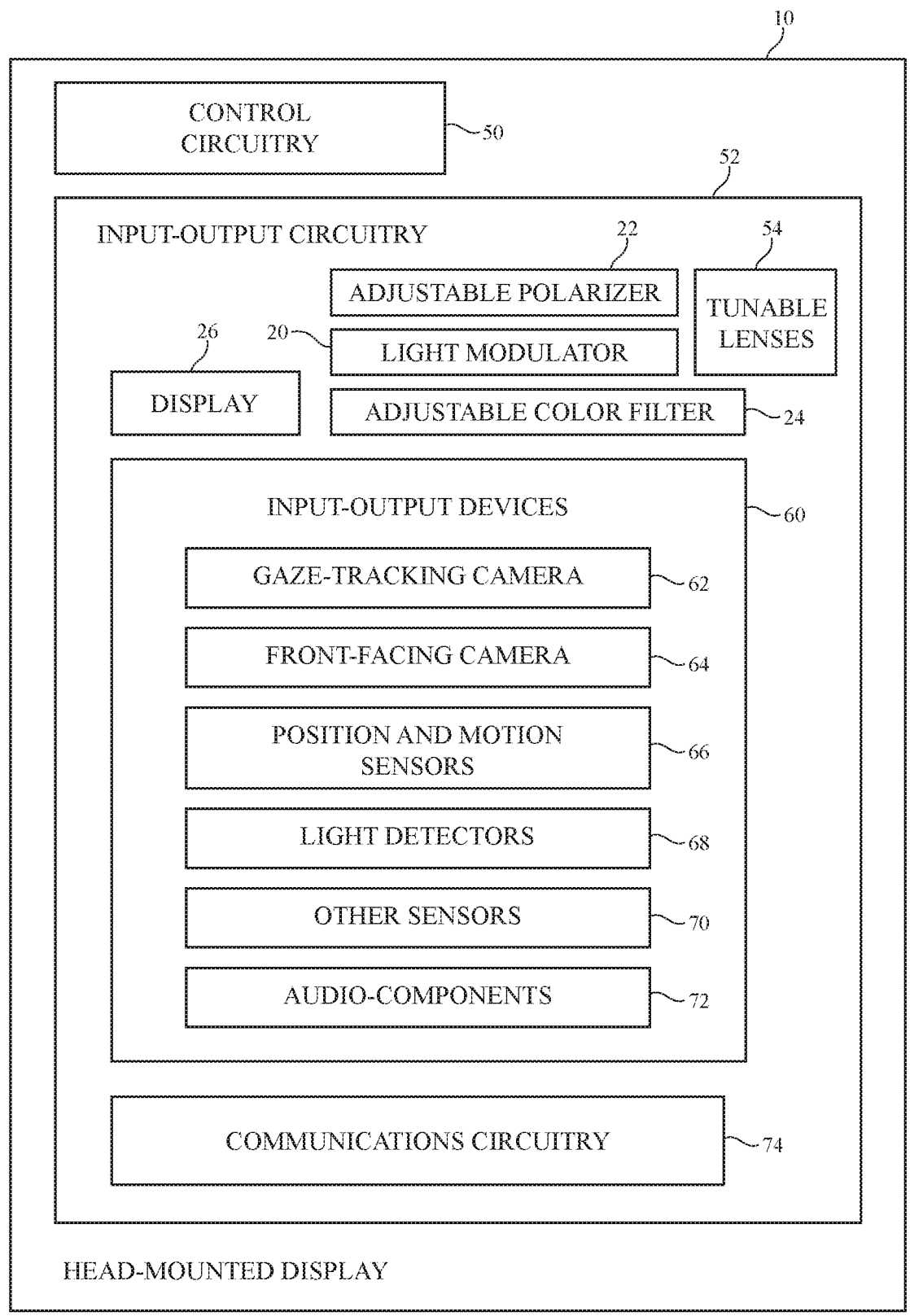
FIG. 1 is a schematic diagram of an illustrative head-mounted display in accordance with an embodiment.

A schematic diagram of an illustrative head-mounted display is shown in FIG. 1. As shown in FIG. 1, head-mounted display (device) 10 may have control circuitry 50. Control circuitry 50 may include storage and processing circuitry for controlling the operation of head-mounted display 10. Circuitry 50 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 50 may be based on one or more microprocessors, microcontrollers, digital signal processors, baseband processors, power management units, audio chips, graphics processing units, application specific integrated circuits, and other integrated circuits. Software code may be stored on storage in circuitry 50 and run on processing circuitry in circuitry 50 to implement control operations for head-mounted display 10 (e.g., data gathering operations, operations involving the adjustment of components using control signals, etc.).

Head-mounted display 10 may include input-output circuitry 52. Input-output circuitry 52 may be used to allow data to be received by head-mounted display 10 from external equipment (e.g., a tethered computer, a portable device such as a handheld device or laptop computer, or other electrical equipment) and to allow a user to provide head-mounted display 10 with user input. Input-output circuitry 52 may also be used to gather information on the environment in which head-mounted display 10 is operating. Output components in circuitry 52 may allow head-mounted display 10 to provide a user with output and may be used to communicate with external electrical equipment.

As shown in FIG. 1, input-output circuitry 52 may include a display such as display 26. Display 26 may be used to display images for a user of head-mounted display. Display 26 may be a transparent display so that a user may observe real-world objects through the display while computer-generated content is overlaid on top of the real-world objects by presenting computer-generated images on the display. A transparent display may be formed form a transparent pixel array (e.g., a transparent organic light-emitting diode display panel) or may be a formed by a display device that provides images to a user through a beam splitter, holographic coupler, or other optical coupler (e.g., a display device such as a liquid crystal on silicon display).

Adjustable optical components such as adjustable polarizer 22, tunable lenses 54, light modulator 20, and/or adjustable color filter 24 may be incorporated into head-mounted display 10 (e.g., by stacking one or more of these components in series with display 26 so that these components overlap display 26 and so that the user may view real-world objects through these components and display 26, etc.). The adjustable components and display 26 may be adjusted in real time using control signals from control circuitry 50.

Adjustable polarizer 22 may be formed from a grid of perpendicular conductive lines that are interconnected at intersecting nodes by an array of respective switches (e.g., switches that can be placed in a first state to couple horizontal sets of the lines together or a second state to couple vertical sets of the lines together). By configuration of the switches across the surface of the polarizer, selected regions (polarizer pixels) of the adjustable polarizer may be configured to serve as vertical-pass linear polarizers, horizontal-pass linear polarizers, or non-polarizing regions). Adjustable polarizer 22 may also be formed from other adjustable polarizer structures (e.g., liquid crystal adjustable polarizer structures, etc.). The individual areas of polarizer 22 that are separately adjustable may sometimes be referred to as polarizer pixels or individually adjustable polarizer regions.

Tunable lenses 54 may be liquid crystal tunable lenses, tunable lenses based on electrooptic materials, tunable liquid lenses, microelectromechanical systems (MEMS) tunable lenses, or other tunable lenses.

Light modulator 20 may be a spatial light modulator formed from a liquid crystal device, may be a MEMs spatial light modulator, may be a light modulator based on a cholesteric liquid crystal layer, may be a light modulator based on a switchable metal hydride film (e.g., an adjustable magnesium hydride mirror structure), may be a suspended particle device, may be an electrochromic light modulating device, may be a guest-host liquid crystal light modulator, or may be any other suitable light modulator layer for adjusting light transmission. Light modulator 20 may have an array of electrodes or other structures that allow individually adjustable light modulator regions (sometimes referred to as light modulator pixels) to be adjusted between a transparent state (transmission is 100% or nearly 100%) and an opaque state (transmission is 0% or nearly 0%). Intermediate levels of light transmission (e.g., transmission values between 0% and 100%) may also be selectively produced by each of the pixels of light modulator 20.

Adjustable color filter 24 may be electrically adjusted by control circuitry 50. Adjustable color filter 24 may be an adjustable-color-cast light filter that can be adjusted to exhibit different color casts and/or may be a monochromatic adjustable-intensity light filter that has a single (monochromatic) color cast. For example, in one state, adjustable color filter 24 may be clear and may not impose any color cast onto light passing through filter 24. In another state, adjustable color filter 24 may be yellow. In yet another state, color filter 24 may be pink. If desired, filter 24 may have a monochromatic appearance (e.g., filter 24 may be a monochromatic adjustable light filter such as a yellow adjustable light filter that can be adjusted continuously or in a stepwise fashion to exhibit appearances that range from clear to light yellow to strongly yellow). The color and/or intensity (saturation) of color filter 24 may be adjusted continuously (e.g., to any color in a desired color space and/or any strength) or may be set to one of a more restricted group different available colors or range of colors and/or color saturation levels. Color filter 24 may be formed from devices such as a liquid crystal device (e.g., an interference filter with a liquid crystal layer that has an electrically adjustable index of refraction), a phase-change layer based on a chalcogenide material or other materials that can be adjusted to selectively adjust color cast, a guest-host liquid crystal device or other device with an absorption spectrum that can be electrically controlled, an electrooptic device, an electrochromic layer, or any other device that exhibits a tunable color (adjustable color cast) as a function of applied control signals. Adjustable color filter 24 may have electrodes (e.g., an array of individually addressable electrodes) or other structures that allow individual regions of color filter 24 to be adjusted. The individually adjustable regions of color filter 24 may sometimes be referred to as adjustable color filter pixels.

There may be any suitable number of display pixels in display 26, adjustable polarizer pixels in adjustable polarizer 22, adjustable light modulator pixels in light modulator 20, and adjustable color filter pixels in adjustable color filter 24 (e.g., 0-1000, 10-10,000, 1000-1,000,000, 1,000,000 to 10,000,000, more than 1,000,000, fewer than 1,000,000, fewer than 10,000, fewer than 100, etc.). If desired, the functions of display 26, polarizer 22, light modulator 20, and/or color filter 24 may be implemented using devices that adjust two or more optical parameters simultaneously. For example, a device may simultaneously adjust light transmission and color cast or a device may simultaneously adjust polarization and light transmission, etc.

Input-output circuitry 52 may include components such as input-output devices 60 for gathering data and user input and for supplying a user with output. Devices 60 may include cameras such as cameras 62 and 64.

Camera(s) 62 may face a user's eyes and may track a user's gaze. Cameras such as cameras 62 may determine the location of a user's eyes (e.g., the centers of the user's pupils), may determine the direction in which the user's eyes are oriented (the direction of the user's gaze), the user's pupil size (e.g., so that light modulation, polarization, coloration, and/or other optical parameters and/or the amount of gradualness with which one or more of these parameters is spatially adjusted and/or the area in which one or more of these optical parameters is adjusted is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information and may therefore sometimes be referred to as gaze detection, eye tracking, gaze tracking, or eye monitoring cameras. If desired, other types of image sensors (e.g., infrared and/or visible light-emitting diodes and light detectors, etc.) may also be used in monitoring a user's gaze. The use of a gaze detection camera such as camera 62 is merely illustrative.

Cameras such as front-facing camera(s) 64 may be used to capture images of the real-world environment surrounding the user. For example, one or more front-facing cameras 64 may be used to capture images of real-world objects in front of a user and on the left and right sides of a user's field of view. The images of real-world objects that are gathered in this way may be presented for the user on display 26 and/or may be processed by control circuitry 50 to determine the locations of electronic devices (e.g., displays, etc.), people, buildings, and other real-world objects relative to the user. The real-world environment may also be analyzed using image processing algorithms. Information from camera 64 may be used in adjusting optical components and controlling display 26.

As an example, control circuitry 50 can identify the location of a real-world object such as a door to a building and can automatically overlay computer-generated content (e.g., a text label) on the door. As another example, control circuitry 50 may identify regions of the user's field of view that contain sources of glare. Control circuitry 50 may then adjust an appropriate light modulator pixels in light modulator 20 and/or polarizer pixels in adjustable polarizer 22 to prevent the glare from reaching the eyes of the user. Control circuitry 50 may also monitor the color (e.g., color temperature, color coordinates, etc.) of real-world objects. Circuitry 50 may then issue commands to adjustable color filter 24 to adjust the color cast of adjustable color filter 24 and thereby alter the color cast of the real-world objects as viewed by the user.

In addition to adjusting adjustable components such as display 26, polarizer 22, modulator 20, filter 25, and lenses 54 based on information from cameras 62 and/or 64, control circuitry 50 may gather sensor data and user input from other input-output circuitry 52 to use in controlling head-mounted display 10. As shown in FIG. 1, input-output devices 60 may include position and motion sensors 66 (e.g., compasses, gyroscopes, accelerometers, and/or other devices for monitoring the location, orientation, and movement of head-mounted display 10, satellite navigation system circuitry such as Global Positioning System circuitry for monitoring user location, etc.). Using sensors 66, for example, control circuitry 50 can monitor the current direction in which a user's head is oriented relative to the surrounding environment. Movements of the user's head (e.g., motion to the left and/or right to track on-screen objects and/or to view additional real-world objects) may also be monitored using sensors 66.

Light detectors 68 may include ambient light sensors that measure ambient light intensity and/or ambient light color. Input-output devices 60 may also include other sensors and input-output components 70 (e.g., force sensors, temperature sensors, touch sensors, buttons, capacitive proximity sensors, light-based proximity sensors, other proximity sensors, strain gauges, gas sensors, pressure sensors, moisture sensors, magnetic sensors, etc.). Audio components 72 may include microphones for gathering voice commands and other audio input and speakers for providing audio output (e.g., ear buds, bone conduction speakers, or other speakers for providing sound to the left and right ears of a user). If desired, input-output devices 60 may include haptic output devices (e.g., vibrating components), light-emitting diodes and other light sources, and other output components. Circuitry 52 may include wired and wireless communications circuitry 74 that allows head-mounted display 10 (e.g., control circuitry 50) to communicate with external equipment (e.g., remote controls, joysticks and other input controllers, portable electronic devices, computers, displays, etc.) and that allows signals to be conveyed between components (circuitry) at different locations in head-mounted display 10.

Figure 2:
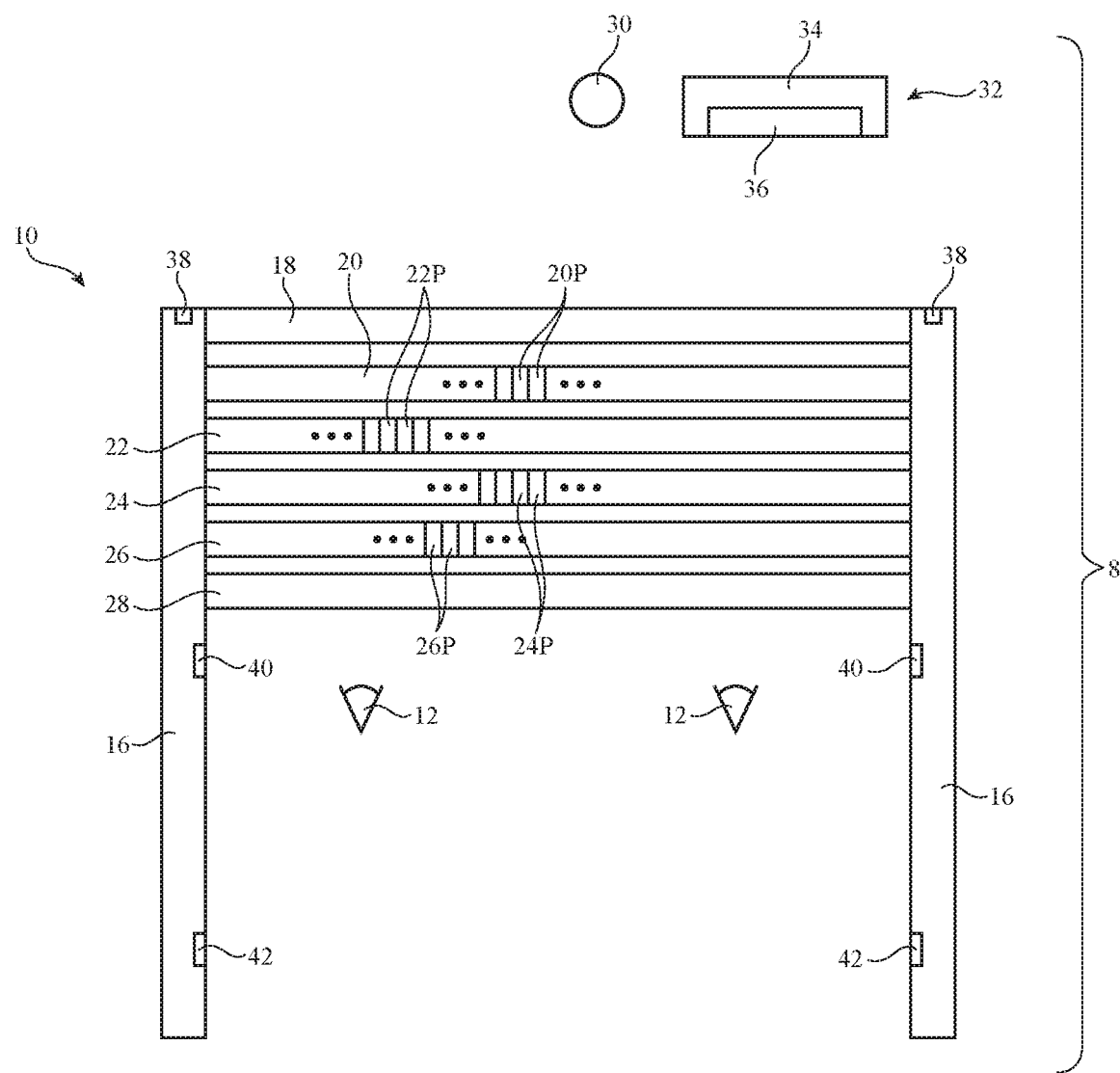
FIG. 2 is a top view of an illustrative head-mounted display in accordance with an embodiment.

The components of head-mounted display 10 may be supported by a head-mountable support structure such as illustrative support structure 16 of system 8 of FIG. 2. Support structure 16 may have the shape of the frame of a pair of glasses (e.g., left and right temples and other frame members), may have a helmet shape, or may have other head-mountable configuration. When worn of the head of a user, the user may view real-world objects such as objects 30 and 32 through components such as components 18, 20, 22, 24, 26, and 28.

Components 38 may be mounted on the front of support structure 16. Components 38 may include front-facing cameras 64 and/or sensors and other components in input-output circuitry 52 for detecting the positions of real-world objects such as objects 30 and 32 and/or for capturing images of the real-world (e.g., images of real-world objects 30 and 32). In the example of FIG. 2, object 32 is an electronic device such as a computer or other electronic equipment having a display such as real-world display 36 mounted in a housing such as electronic equipment housing 34. Objects such as object 30 may include natural and manmade objects, people, buildings, sources of glare such as reflective objects (e.g., objects that produce glare from reflected light), the sun, lights, other light sources, etc.

Components such as components 40 may be supported by support structures 16 adjacent to user's eyes 12. Components 40 may include gaze detection cameras 62 (image sensors) and/or other sensors for detecting the direction of the user's gaze. Components 42 may include speakers (e.g., ear speakers) or other audio components 72 that play audio (e.g., audio associated with computer-generated images and/or other content that is being displayed using display 26, etc.). Components 42 may be mounted adjacent to the ears of a user.

Components such as components 18 and 28 may be optical systems (e.g., collections of one or more fixed and/or tunable lenses) and/or may include clear transparent members (e.g., protective layers). The lenses in optical systems 18 and 28 may be used to focus light from display 26 and/or light from real-world objects 30 and 32 that is passing through components 20, 22, and 24 before this light reaches the user's eyes 12.

With one illustrative configuration, the components supported by support structure 16 include adjustable light modulator 20, adjustable polarizer 22, adjustable color filter 24, and display 26. Light modulator 20 may have pixels such as adjustable light modulator pixels 20P. Adjustable polarizer 22 may have adjustable polarizer pixels 22P. Adjustable color filter 24 may have adjustable color filter pixels 24P. Display 26 may have a pixel array (e.g., a two-dimensional array of pixels with rows and columns) formed from display pixels 26P. Pixels 26P may be located in front of the user's eyes 12 as shown in FIG. 2 or may be located on the sides of display 10 (e.g., in configurations in which images are directed towards the user's eyes 12 using an optical coupler in front of the user's eyes). Pixels 26P may be square, may be round, or may have other shapes, may be zigzagged throughout display 26, or may have other suitable shapes and/or layouts. The edges of pixels 20P, 24P, and/or 22P may have straight and/or non-straight edges. For example, pixels 20P, 24P, and/or 22P may have jagged edges (e.g., sawtooth edges or other non-straight edges) to help create gradual transitions (gradual spatial modulation) of light transmission, color cast changes, and/or polarization changes for reduced user distraction. If desired, the sizes of pixels 20P, 24P, and/or 22P may be sufficiently small to be unresolvable to a user and therefore not visually noticeable (e.g., not optically resolvable to a naked eye and therefore producing gradual spatial modulation).

Figure 3:
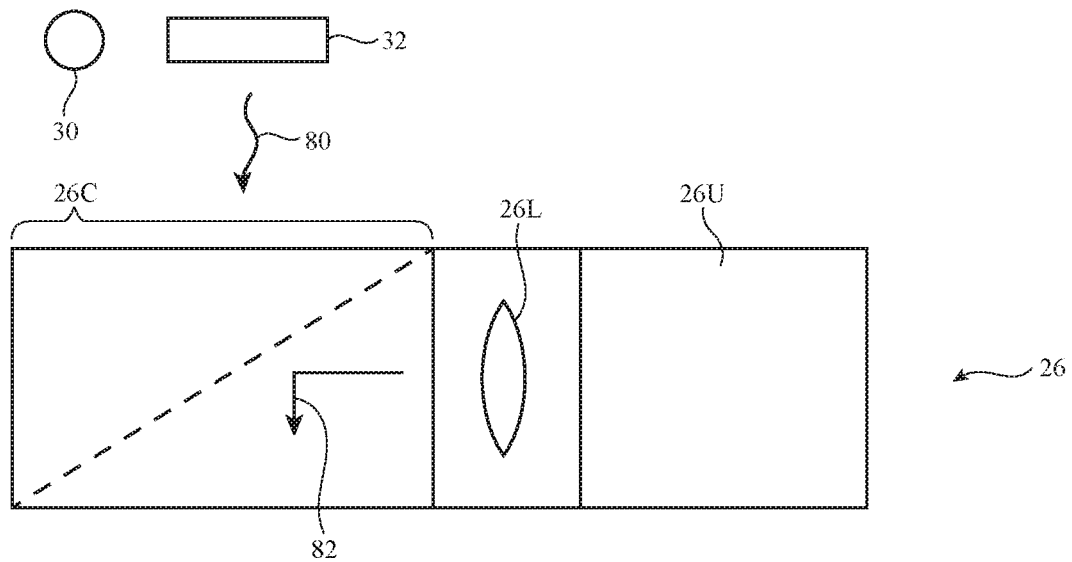
FIG. 3 is a diagram of an illustrative transparent display with a tunable lens and a partially reflective element that serves as an optical coupler to direct images from one or more non-transparent display panels to a user in accordance with an embodiment.

FIG. 3 is a diagram showing how display 26 may be a transparent display that has a display unit 26U that creates images that are reflected toward the eyes 12 of the user by optical coupler 24C. Display unit 26U may include, for example, a liquid crystal on silicon display and/or any other type of display with a pixel array that displays images. Display unit 26U may include light-emitting diodes or other light sources for illuminating the images produced by a liquid crystal on silicon display (as an example). In some configurations, images may be produced by multiple display devices in display unit 26U (e.g., multiple images that are combined using an optical combiner in display unit 26U).

Optical coupler 24C may be a beam splitter, a holographic coupler, a partially reflective element such as a partially reflective mirror, or other optical coupler. Optical coupler 24C may be placed in front of the user's eyes 12 and may be partially transparent, so that the user can view external objects such as real-world objects 30 and 32 through optical coupler 24C. During operation, light from an array of display pixels in display unit 26U such as light 82 may reflect from a beam splitter element towards user eyes 12 or a waveguide, holographic coupling element, and/or other structures in coupler 26C may direct light 82 towards user eyes 12. Light 80 from real-world objects 30 and 32 may also pass through the beam splitter or other coupling structures in optical coupler 26C to the user's eyes 12. In this way, the user may view both real-world content and overlaid images (e.g., computer-generated images) from display unit 26U, creating an augmented reality environment.

Display 26 may include fixed and/or tunable lenses, as illustrated by lens 26L. These lenses, which may include reflective elements, transparent lens elements, and/or other lens structures, may be dynamically adjusted during operation of head-mounted display to place computer-generated images from display unit 26U at multiple different focal planes using time-division multiplexing, thereby enhancing the realism of the user's augmented reality environment. Images may also be placed at multiple different focal planes by combining images from multiple different display devices in unit 26U using a beam splitter or other optical combiner.

Figure 4:
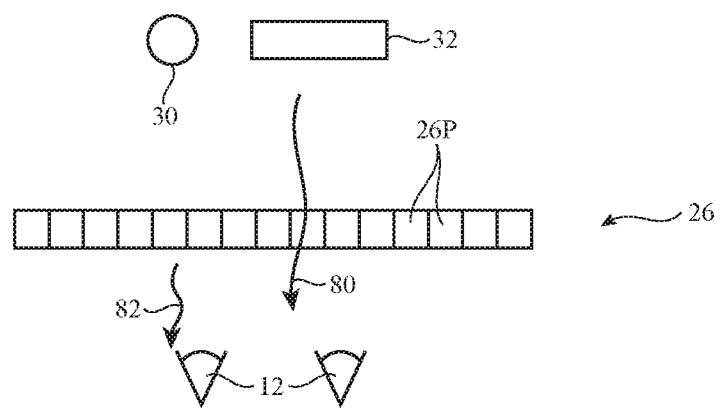
FIG. 4 is a diagram of an illustrative transparent pixel array for a transparent display in accordance with an embodiment.

If desired, an augmented reality environment may be created using a transparent display panel configuration for display 26, as shown in FIG. 4. As shown in the example of FIG. 4, display 26 may be a transparent organic light-emitting diode display panel or other suitable transparent display device with a transparent array of pixels 26P. The transparency of display 26 of FIG. 4 allows light 80 from real-world objects 30 and 32 to pass through display 26 for viewing by user eyes 12. Images may also be displayed on display 26 using pixels 26P and light 82 from these images (e.g., computer-generated images) may be viewed by user eyes 12.

Figure 5:
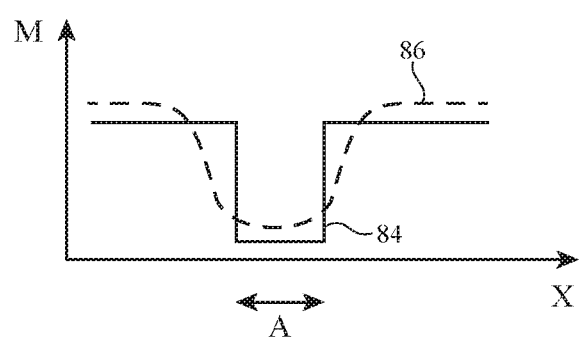
FIG. 5 is a diagram showing how an adjustable component such as an adjustable light modulator, adjustable color filter, or adjustable polarizer may abruptly or smoothly adjust an attribute such as light transmission, color cast, and polarization filtering behavior in accordance with an embodiment.

By using pixels 20P, 22P, and 24P, selected regions of a user's field of view may be provided with desired light transmission (and therefore desired opacity), desired polarization filtering, and desired color cast (coloration). FIG. 5 shows how characteristics such as light transmission, polarization filtering, and/or color cast (each represented by characteristic M in the graph of FIG. 5) may be changed abruptly (e.g., only in area A along dimension X across the user's field of view, as indicated by curve 84) or may be changed gradually, as indicated by curve 86. In some situations (e.g., when applying a selective darkening to a particular area to reduce glare in a scene), it may be desirable to use gradual changes of the type indicated by curve 84 to help make the change less noticeable to a user (e.g., to make the edges of a darkened region or otherwise modified region indistinct and less distracting to the user). The pixel size of pixels 20P, 22P, and 24P may also be sufficiently small to be unnoticeable to the user. In other situations (e.g., when blocking out a window or other rectangular part of building to display an augmented reality label), it may be less disruptive to the user to use an abrupt change. Combinations of gradual and abrupt changes may also be made. Blocking (e.g., creation of gray or black regions by locally enhancing light absorption in one or more regions with light modulator pixels 20P) may be performed to reduce glare or to create dark backgrounds for augmented reality images (e.g., augmented reality text, graphics, still images, moving images, or other content). Darkened regions in light modulator 20 may have the shape of a rectangle (e.g., when creating a dark region for text or other labels), may have the shape of an virtual reality object (e.g., the shape of a game character or other computer-generated object, the shape of a piece of furniture in an augmented reality application in which pieces of furniture are being overlaid on a real-world scene, etc.), or may have other suitable shapes.

In general, any suitable amount of light modulation, polarization, and/or color cast may be imparted to any one or more desired regions of the user's field of view. Display 26 may also be used to present images to any selected region or regions of the user's field of view. If desired, optical effects such as changes in light transmission, changes in polarization filtering behavior, and/or changes in color cast and/or images produced by display 26 may cover the entire field of view of a user. Gaze detection cameras (e.g., cameras such as camera 62 of FIG. 1 mounted in locations such as the locations of components 40 of FIG. 2) may be used to detect eye position, pupil size, pupil center location, gaze direction, and other gaze (eye) parameters. Control circuitry 50 may use this information in addition to information from other input-output circuitry 52 (e.g., sensor input, user head motion data, images from front-facing cameras 64, etc.) to determine how to optimally adjust the pixels of the light modulator, adjustable polarizer, and adjustable color filter. For example, the size and location of the regions in which these components are adjusted may be determined by pupil size, gaze direction information, real-world object location information, etc. Component and display adjustments may also be made based on orientation information from sensor 66, light levels measured by light detector 68, and other information gathered using input-output circuitry 52.

Figure 6:
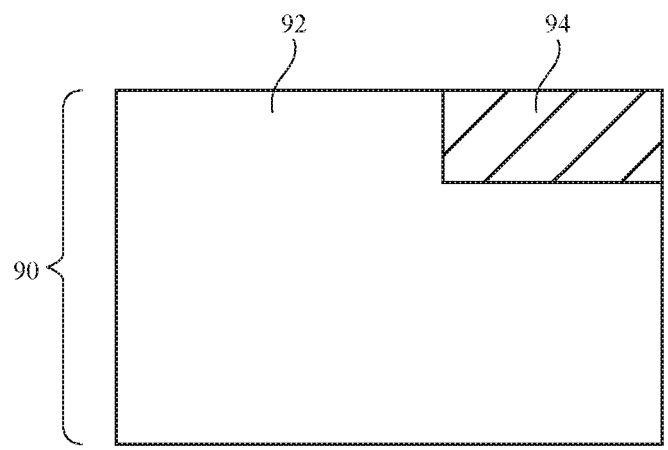
FIG. 6 is a diagram showing how a portion of a user's field of view may be modified by increasing opacity, adjusting color, adjusting polarizer behavior, and/or overlaying computer-generated content in accordance with an embodiment.
Figure 7:
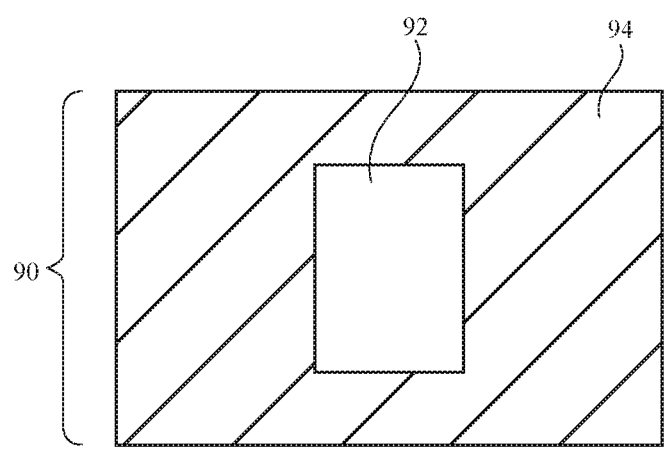
FIG. 7 is a diagram showing how a portion of a user's field of view may be darkened, colored, polarized, or left unmodified while surrounding portions are darkened, colored, polarized, and/or overlaid with computer-generated content in accordance with an embodiment.

Rectangle 90 of FIGS. 6 and 7 represents a user's field of view. In the examples of FIGS. 6 and 7, the user's field of view has been divided into two regions: region 92 and region 94. Each of these regions may be provided with light 80 corresponding to real-world objects 30 and 32 and each of these regions may be overlapped by display 26 (using a transparent display of the type shown in FIG. 4 or an optically coupled non-transparent display of the type shown in FIG. 3) so that computer-generated content can be displayed for the user. The size, shapes, and locations of the boundaries of regions 92 and 94 may be updated in real time by control circuitry 50 using information from input-output circuitry 52 (e.g., using information on the position of objects 30 and 32 from front-facing camera 64 and other sensors in devices 60, based on information from gaze detection camera 62, based on the orientation of support 16 and other parts of head-mounted display 10, etc.).

In an illustrative scenario in which light modulator 20, adjustable polarizer 22, and adjustable color filter 24 are directed by control circuitry 50 to exhibit maximum transmission and no color or polarization effects while display 26 is turned off, the user will be able to view the real world across field of view 90. If, however, one or more of modulator 20, polarizer 22, color filter 24, and/or display 26 is activated in a particular region of the user's field of view 90, that characteristics of that region will be modified.

As an example, light modulator 20 may be configured to be transparent in region 92 of FIG. 6 and to be opaque in region 94 of FIG. 6. Area 94 may be located in the corner of field of view 90 or may be located in a more central portion of field of view 90 where area 94 is surrounded by area 92. When region 92 is transparent and region 94 is opaque, the real world will be visible in region 92 and region 94 will be black in the absence of displayed content from display 26. This type of arrangement may be used, for example, to block objectionable or distracting content in the user's field of view from the user. Full or partial reductions in light transmission through selected areas of field of view 90 such as area 94 may also be used to block glare from lights, glare from reflections, glare from the sun, or other sources of distracting and unwanted light. If desired, display 26 may be used to display notifications, computer-generated content such as still and/or moving images corresponding to a game or other application, or other visual content in region 94. The dark background created by making region 94 opaque may help the user view display output in region 94 because the light associated with images in region 94 will not need to compete with light from underlying real-world objects. Display content may also be presented in region 92 or display 26 may not display any content in region 92 (in this example).

In another illustrative scenario, region 92 of FIG. 6 may be transparent so that real-world content is viewable in region 92 while the color cast of region 94 is adjusted by adjustable color filter 26. If desired, the polarization state of polarizer 22 may be adjusted in region 94 (e.g., to filter out horizontally polarized light such as light reflecting from real-world bodies of water). Polarizer 22 may be simultaneously configured to filter out vertically polarized light or to not perform any polarization filtering in region 92.

Color filter 24 may be used to impart color cast (e.g., a yellow cast, a pink cast, a blue cast, etc.) to region 92 of FIG. 6 relative to region 92 of FIG. 6. This type of arrangement may be used, for example to adjust the white balance of real-world objects in region 92 to match the white balance of images being displayed by display 26 in region 94. Making color filter adjustments for white balance by adjusting the color cast of region 92 may be more power efficient and/or more visually appealing than making adjustments to display 26 to adjust the color cast of images on display 26.

In the example of FIG. 7, region 94 surrounds region 92. Region 94 may be darkened (e.g., rendered partly or fully opaque using the light modulator) while region 92 is made completely transparent (or at least more transparent than region 94). This type of arrangement may be used, for example, when using head-mounted display 10 to highlight an object in the user's field of view. Real-world objects in region 94 may be blocked from the user's view. Transparent region 92 of FIG. 7 may be dynamically aligned with display 36 of device 32 of FIG. 2. For example, control circuitry 50 may use image data gathered with front-facing camera 64 to detect the location of display 36 and, based on this information, may darken appropriate pixels 20M in light modulator 20 to visually highlight display 36 and to block out distracting peripheral objects. This may be done automatically or may be done only in the presence of bright light detected by ambient light sensor 68 (e.g., when ambient light conditions may make viewing of display 36 difficult). Computer-generated content (e.g., a beach scene from pre-recorded video, a still image, graphics, solid colors or patterns, computer-generated images for a game or other application, etc.) may be overlaid over darkened region 94 or region 94 may be left black (or at least partly darkened).

If desired, color filter 24 may be used to impart color cast (e.g., a yellowish or bluish cast) to region 94 relative to region 92 of FIG. 7. This type of arrangement may be used, for example to adjust the white balance of real-world objects in region 94 to the color of images being displayed by display 26 in region 94 relative to region 92.

In some situations, it may be desirable to impart a global color to color filter 24. As an example, a user may desire to operate head-mounted display 10 as a pair of colored sunglasses or as a pair of colored reading glasses. In a sunglass scenario, light modulator 20 may be adjusted to produce a desired amount of light dimming, polarizer 22 may be adjusted to block horizontally polarized light (light that is linearly polarized parallel to the ground), and color filter 24 may be adjusted to impart a desired color to incoming light (e.g., yellow, orange, green, brown, etc.). The amount of light dimming, polarization control, and the color cast that is imparted to incoming light may be adjusted dynamically by control circuitry 50 (e.g., based on forward-facing camera information, gaze detection camera information, ambient light sensor readings, etc.). In a reading glasses scenario, optical systems 18 and/or 28 may be adjusted to provide the user with a desired reading glass magnification, light modulator 20 and polarizer 24 may be configured to exhibit maximum transmission and color filter 24 may be clear or may be provide a color cast (e.g., orange, etc.) of the type that may enhance the ability of the user to read text. Magnification, filter color, and other settings may be adjusted in response to user input, and in response to other input such as sensor readings, camera information, and eye focus point (e.g., the point of focus of the user's gaze as determined from pupil vergence or other gaze information from a gaze detection camera).

As the foregoing examples demonstrate, region 90 (the user's field of view or part of the user's field of view) may be subdivided into multiple subregions such as regions 92 and 94. There are two subregions (92 and 94) in the examples of FIGS. 6 and 7, but more subregions may be created if desired (e.g., 2-10, more than 2, more than 5, fewer than 20, etc.). In each subregion, control circuitry 50 can create abrupt and/or smoothly graded changes in light transmission, polarization filtering, and color filtering. For example, in each of multiple portions of the user's field of view, control circuitry 50 can create a different light transmission (e.g., a visible light transmission T that is set to an adjustable value between 0% and 100%) using the individually adjustable pixels 20P of light modulator 20, can create different polarization filter configurations (e.g., different linear polarization pass axis orientations) using the individually adjustable pixels 22P of polarizer 22, and/or can create desired color casts using the individually adjustable pixels 24P of color filter 24. In each of these regions, display pixels 26P may be inactive and may display no content or may be active and used in displaying images. Adjustments may be made based on orientation, eye behavior, detected attributes of real-world objects, sensor input, user commands, or other parameters.

Consider, as an example, a scenario in which display 26 may be operated in different orientations (e.g., in a configuration in which one or more components such as display 26, modulator 20, polarizer 22, and color filter 24 are mounted in a portable electronic device such as a cellular telephone or tablet). Sensors 66 (e.g., an accelerometer) may be used in monitoring the orientation of display 26 relative to the earth. When display 26 is horizontal, it can be assumed that a user is using display 26 to display documents (text, graphics, maps, web pages, etc.). When display 26 is vertical, it can be assumed that the user is interested in viewing the real-world through display 26 and is interested in using images on display 26 to label and otherwise augment real-world objects that are visible through display 26. Accordingly, control circuitry 50 can be configured to darken modulator 20 in response to detecting that display 26 is being held horizontally in a plane parallel to the surface of the earth and can be configured to make modulator 20 transparent in response to detecting that display 26 is being held vertically in a plane perpendicular to the surface of the earth (e.g., in an orientation in which the surface normal of display 26 lies parallel to the surface of the earth). With this arrangement, the darkened state of modulator 20 in the horizontal orientation will block out real-world objects that might otherwise be visible through display 26 when display 26 is being used to view documents. The transparent state of modulator 20 in the vertical orientation will allow real-world objects to be viewed through display 26 while display 26 is being used to annotate (augment) the real-world objects with computer-generated images (text, graphics, etc.).

Consider, as another example, a scenario in which control circuitry 50 uses gaze-tracking camera 62 and/or other gaze tracking system components (e.g., light sources that emit beams of light so that reflections of the beams from eyes 12 may be detected), to monitor the user's eyes. An eye tracking system may, as an example, monitor the location (e.g., the plane) at which the user's eyes 12 are focused in real time. In response to detection that eyes 12 are focused on display 26, control circuitry 50 can enhance the opacity of light modulator 20 (e.g., light modulator 20 can be made opaque), thereby enhancing the visibility of content on display 26 and blocking out real-world objects behind display 26. In response to detection that eyes 12 are focused at a distance (e.g., at infinity or at another distance that is farther away from the user's eyes 12 than display 26 or the apparent position of display 26), control circuitry 50 can be configured to enhance the transparency of light modulator 20 (e.g., light modulator 20 can be made transparent), thereby enhancing the visibility of real-world objects through display 26 and allowing pixels 26P in display 26 to optionally be used to display computer-generated content over real-world objects that are visible through display 26.

If desired, control circuitry 50 can be configured to adjust modulator 20 to be transparent during a normal operating mode (so that objects 30 and 32 can be viewed through display 26) and to be opaque in all but a subset of region 90 (e.g., to be transparent in region 92 of FIG. 7 while being opaque in region 94 of FIG. 7), thereby allowing real-world objects that are aligned with region 92 to be visible and blocking real-world objects that are not overlapped by region 92. This type of highlighting mode may be invoked in response to user input, in response to detection of an object of interest for highlighting (e.g., in response to detecting the presence of display 36 of FIG. 2 using a front-facing camera 64), in response to orientation information (e.g., detecting that display 26 is vertical with sensor 66), in response to detection of sources of glare outside of region 92 (e.g., using front-facing camera 64), in response to detection of a particular operating mode for display 10 (e.g., in response to running of a particular application or other software code on control circuitry 50), or in response to satisfaction of other criteria.

In some situations, it may be desirable to exclude background objects (e.g., by making one or more subregions such as region 94 opaque while making region 92 transparent). This type of arrangement may be use to remove glare, to block undesired distractions (text, moving objects, and/or other visual clutter) from view, etc. Background object exclusion operations can be performed automatically by control circuitry 50 based on information gathered by front-facing camera 64 and based on other information gathered by input-output devices 60.

When it is desired to adjust the color cast of the background of a user's field of view or when it is desired to adjust the color of a particular real-world object, control circuitry 50 can direct adjustable color filter 24 to change the color cast of an appropriate set of pixels 24P. This type of color cast change may be performed automatically by control circuitry 50 based on information gathered by input-output devices 60 (e.g., front-facing camera 64, an ambient light sensor, etc.). Manual user input, wirelessly received input from external devices, and/or other input may also be used in excluding background images, adjusting the color of background content and/or objects of interest, highlighting particular objects, and performing other operations with head-mounted display 10.

The arrangement of optical systems 18 and 28, modulator 20, polarizer 22, color filter 24, and display 26 that is shown in FIG. 2 is merely illustrative. The functions of two or more of these components may, if desired, be combined. For example, an electrochromic layer or a liquid-crystal layer combined with a color filter element matrix may serve both as variable opacity layers (light modulators) and as adjustable color filter layers. One or more of modulator 20, polarizer 22, color filter 24, and display 26 can be omitted and/or any or all of these components can be stacked in any desired order within support structures 16. As an example, head-mounted display 10 may include only adjustable light modulator 20 and transparent display 26 and may not include adjustable polarizer 22 or adjustable color filter 24. As another example, head-mounted display 10 may include adjustable color filter 24 and display 26 without including light modulator 20 or adjustable polarizer 22. In another illustrative arrangement, head-mounted display 10 may include adjustable polarizer 22 and transparent display 26 (e.g., using a liquid crystal cell) without including adjustable light modulator 20 or adjustable color filter 24. Opacity, color cast, and/or polarization characteristics and/or the output of display 26 across the field of view of the user may be adjusted as a function of device orientation, may be adjusted as a function of user eye function (direction of gaze, pupil size, focus position, etc.), may be adjusted as a function of background scene characteristics (e.g., brightness level, object distance from display 10, etc.), may be adjusted as a function of operating environment (e.g., based on the identity of a building or the identity of a particular room in a building in which display 10 is determined to be currently operating using a positioning system or other location determination arrangement, based on time of day, etc.), may be adjusted as a function of the nature of a user's current activity (e.g., whether a user is engaged in a sports activity, whether a user is engaged in a driving activity, whether a user is resting, whether a user is moving rapidly or is at rest, etc.), may be adjusted as a function of biometric information (e.g., heart rate, eye movement characteristics, perspiration level, etc.), may be adjusted as a function of detected external stimulus (e.g., highlighting visibility of a real-world object of interest based on detected importance from default importance criteria or user-defined importance criteria), and/or may be adjusted based on other criteria.

Figure 8:
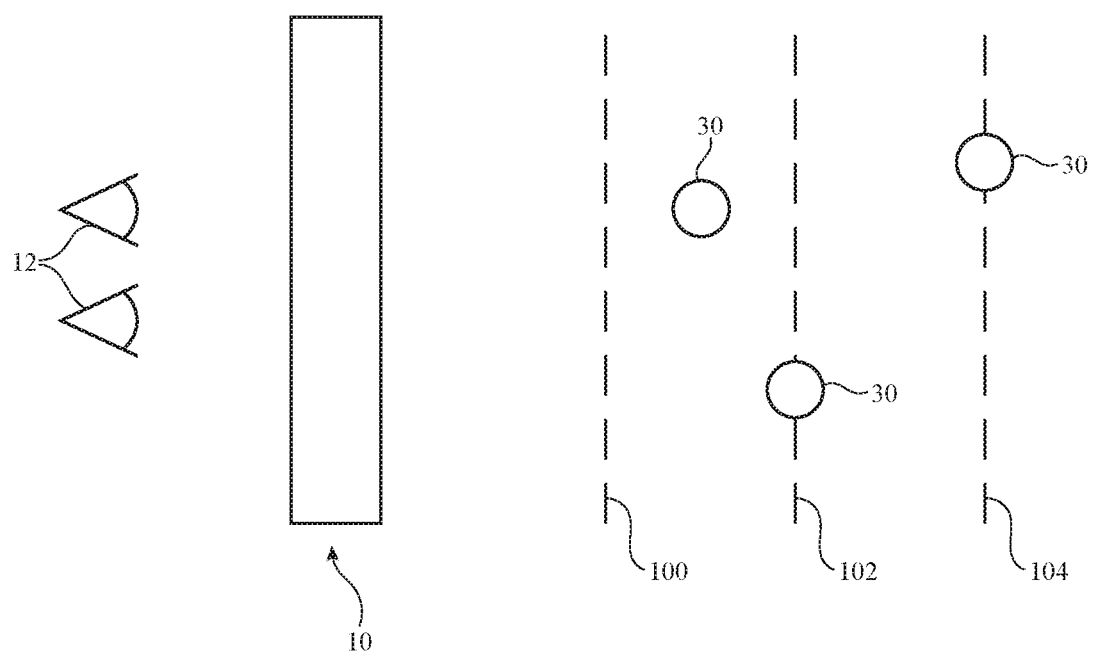
FIG. 8 is a diagram showing how images may be placed at different image planes amongst real-world objects in accordance with an embodiment.

To create realistic three-dimensional virtual reality and/or augmented reality content with display 26, the images presented by display 26 can be created at multiple different image focal planes, such as at focal planes 100, 102, and 104 in the illustrative example of FIG. 8. There are three different focal planes for the displayed images in the example of FIG. 8, but, in general, images may be displayed at any suitable number of focal plane locations (1, 2, at least 2, at least 3, at least 5, at least 10, 2-10, 3-7, 4-8, at least 4 fewer than 20, fewer than 10, fewer than 5, etc.).

With one illustrative arrangement, images may be displayed at each of these different focal plane locations using time division multiplexing and coordinated adjustments to tunable lenses 54 (e.g., tunable lenses in optical systems 18 and/or 28 and/or tunable lenses such as tunable lens 26L of display 26 of FIG. 3). As an example, tunable lens 26L may be adjusted to each of five different focal lengths while display 26 is used to display five different corresponding images in synchronization with these focal length adjustments.

Figure 9:
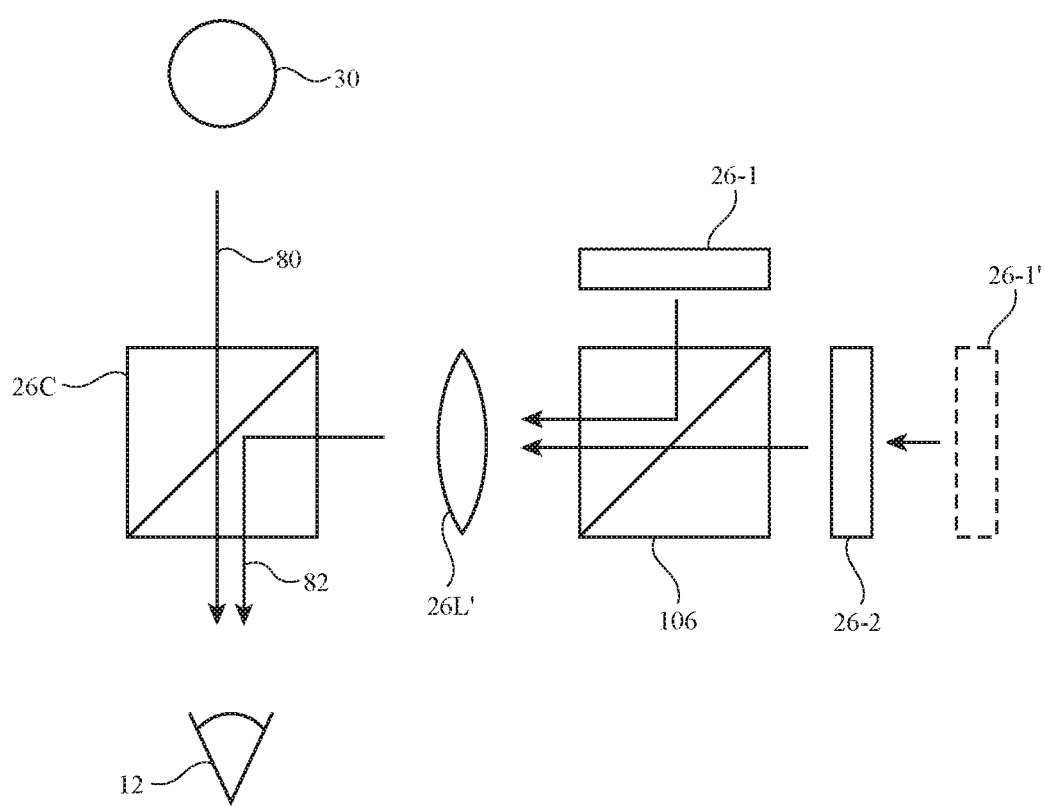
FIG. 9 is a diagram showing how images may be placed at different image planes using optical elements such as tunable lenses and optical combiners in accordance with an embodiment.

Another illustrative arrangement is illustrated in FIG. 9. In the example of FIG. 9, a user may view real-world object 30 through optical combiner 26C and may simultaneously view images from display devices 26-1 and 26-2 that are directed towards the user's eyes 12 by optical combiner 26C. Display devices 26-1 and 26-2 may be organic light-emitting diode display pixel arrays, pixel arrays based on liquid crystal on silicon display devices, or other display devices. Display devices 26-1 and 26-2 may be located at different distances from lens 26L' and may produce image light that is combined and directed towards combiner 26C using optical combiner 106 (e.g., a beam splitter, etc.) so that the images produced by display panels 26-1 and 26-2 may be presented at different respective focal planes in the user's field of view. Time division multiplexing of displayed images need not be used in this type of arrangement, because display panels 26-1 and 26-2 may simultaneously display images. If desired, display panel 26-2 may be transparent and display panel 26-1 may be moved into the position illustrated by panel 26-1' in addition to or instead of using optical combiner 106.

Figure 10:
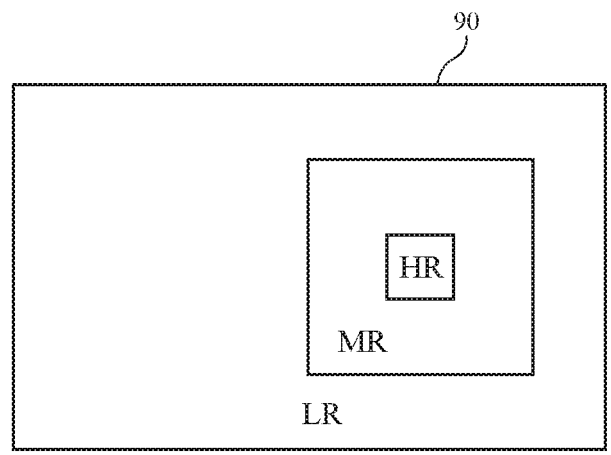
FIG. 10 is a diagram showing how images such as video images may have different resolutions in different areas in accordance with an embodiment.

FIG. 10 shows how images (e.g., video) displayed by display 26 across the user's field of view (region 90) may have different associated resolutions. For example, area HR may contain image content at high resolution (e.g., the native resolution of display 26), area MR may contain image content at medium resolution (e.g., a resolution that is one half or other reduced amount of the resolution of area HR), and content in area LR may have a lower resolution than in both areas MR and HR. Providing video (or other images) on display 26 at multiple different resolutions (sometimes referred to as foveated video) may reduce the processing burden on head-mounted display 10. In computer-generated video, images may be foveated by positioning areas HR and MR over portions of an image that contain the most detailed and interesting content in the user's field of view. In this type of scenario, low resolution area LR may correspond to less interesting peripheral portions of a scene. The locations of areas HR, MR, and LR can be adjusted over time (e.g., to accommodate changes in the location of the interesting portions of the computer-generated video).

If desired, foveated imaging techniques may be used during video capture operations with front-facing camera 64. For example, a user may desire to make a foveated video recording of real-world objects surrounding the user. When foveated video recording is initiated, control circuitry 50 can monitor the direction of the user's gaze using gaze-tracking camera 62 or other sensors. Control circuitry 50 can then process captured video so that high resolution video is recorded in area HR, medium resolution video is recorded in region MR, and low resolution video is recorded in region LR. The locations of regions HR and MR may be centered on the user's direction of gaze and may be updated dynamically based on changes in the detected direction of the user's gaze. For example, if a user is gazing to the left, area HR and area MR can be located on the left accordingly. If a user's gaze moves to the right, area HR and area MR can be moved to the right. In this way, high resolution portions of the foveated video are only recorded where the user is gazing, which corresponds to the most interesting portion of the scene. It is not necessary for control circuitry 50 to capture high resolution images corresponding to the user's entire field of view, which might be burdensome.

Figure 11:
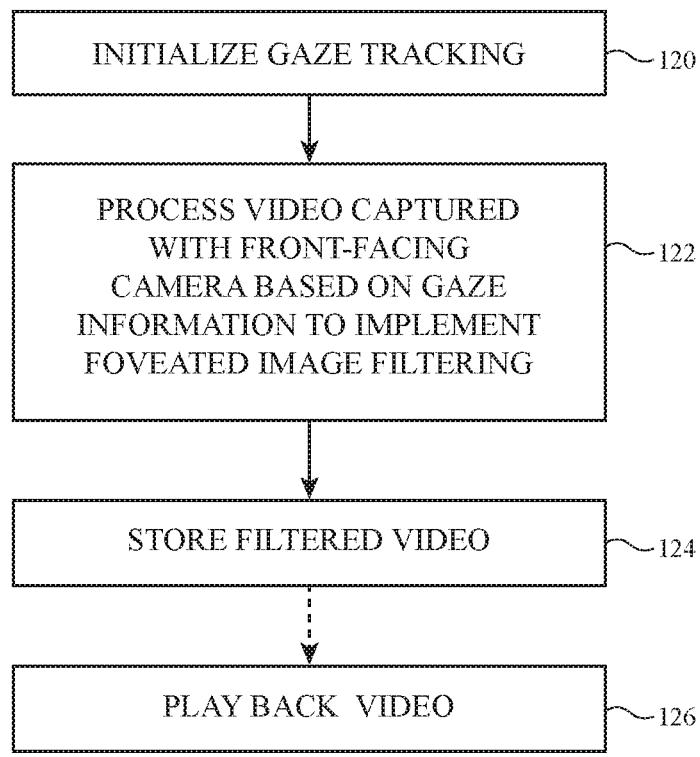
FIG. 11 is a flow chart of illustrative operations involved in capturing foveated video based on information from a gaze detection camera in accordance with an embodiment.

Illustrative operations associated with foveated imaging are shown in the flow chart of FIG. 11. During the operations of block 120, control circuitry 50 can gather information on the direction of a user's gaze (the user's point of gaze). This information can be used during the operations of block 122 to process images captured with front-facing camera 64 or other suitable image sensor in device 10. For example, high resolution video may be recorded in area HR, medium resolution video may be recorded in region MR, and low resolution video may be recorded in region LR, as described in connection with FIG. 10. This captured moving image information, can be stored by control circuitry 50 during the operations of block 124 and played back at a later time (see, e.g., the operations of block 126).

Figure 12:
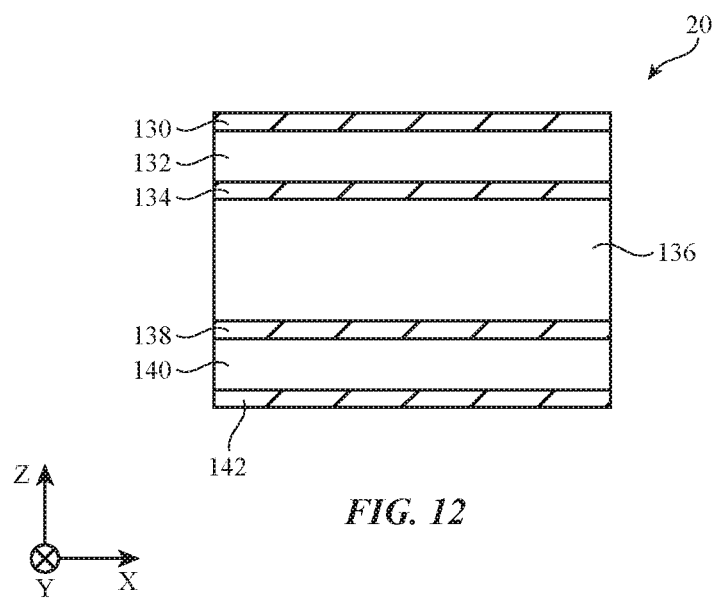
FIG. 12 is a cross-sectional side view of an illustrative optical component such as a light modulator in accordance with an embodiment.

A cross-sectional side view of a portion of an illustrative liquid crystal light modulator is shown in FIG. 12. As shown in FIG. 12, light modulator 20 may include a layer of liquid crystal material such as liquid crystal layer 134. Layer 134 may be sandwiched between opposing electrodes such as electrode 132 and electrode 138. Electrodes such as electrodes 132 and 138 may be patterned in lateral dimensions X and Y to form a desired pattern of light modulator pixels 20P. Electrodes 132 and 138 may be formed from indium tin oxide or other transparent conductive materials. Electrode 132 may be supported by transparent substrate 132. Electrode 138 may be supported by transparent substrate 140. Substrates 132 and 140 may be formed from transparent polymer, transparent glass, or other transparent materials. Polarizers 130 and 140 may be formed on the outer surfaces of substrate 132 and 140, respectively, so that substrates 132 and 140 are sandwiched between polarizers 130 and 142. In some liquid crystal light modulators (e.g., guest-host liquid crystal light modulators) polarizers 130 and 142 may be omitted.

Figure 13:
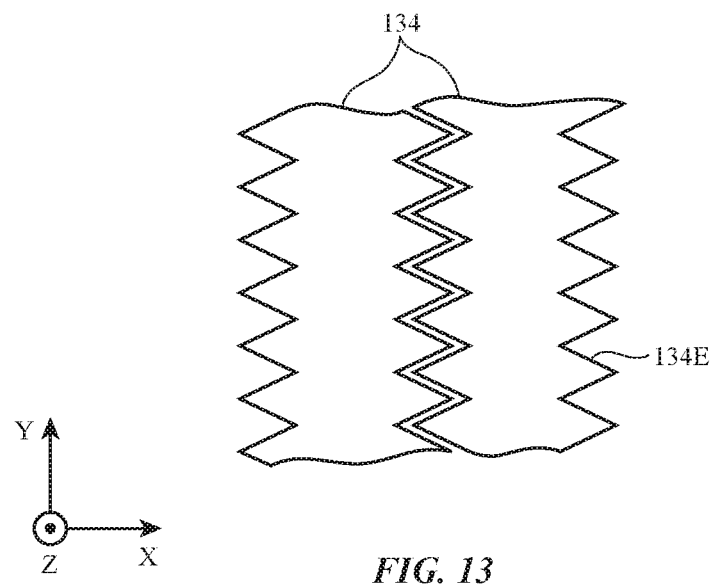
FIGS. 13 and 14 are top views of illustrative electrodes with jagged edges in accordance with an embodiment.
Figure 14:
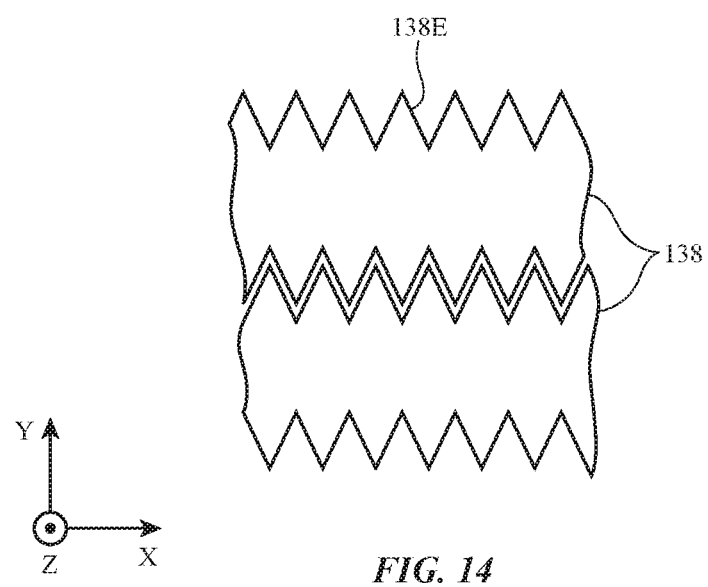

To avoid creating undesirable hard edges along the periphery of each pixel 20P in light modulator 20, some or all of the edges of the electrodes in light modulator 20 may be provided with non-straight edges. For example a sawtooth pattern or other jagged edge pattern (e.g., a pattern with a series of protrusions and recesses) may be provided along one or more of the edges of the electrodes. FIG. 13 shows how electrodes 134 may be provided with non-straight vertically extending edges 134E. FIG. 14 shows how electrodes 138 may be provided with non-straight horizontally extending edges 138E. In light modulator 20, vertically extending electrodes 134E of FIG. 13 may be overlapped by horizontally extending electrodes 138. Due to the presence of the rough edges of the electrodes, the strength of the electric field along the Z dimension that is produced when a voltage is applied across electrodes 134 and 138 will smoothly vary along the rough edges of the electrodes (e.g., the light modulation effects in dimensions X and Y at the boundaries of the electrodes will be fuzzy and indistinct and undesirable abrupt changes in the amount of light transmission between various pixels 20P in display 10 will be avoided). If desired, electrodes with jagged edges may be used in adjustable polarizer devices, adjustable color filter devices, adjustable lenses, and/or other adjustable optical devices. For example, adjustable color filter pixels 24P and/or adjustable polarizer pixels 22P may have electrodes 134 and/or 138 with non-straight edges to provide gradual spatial modulation of color cast and/or polarization in addition to or instead of providing gradual spatial modulation of light transmission.

Figure 15:
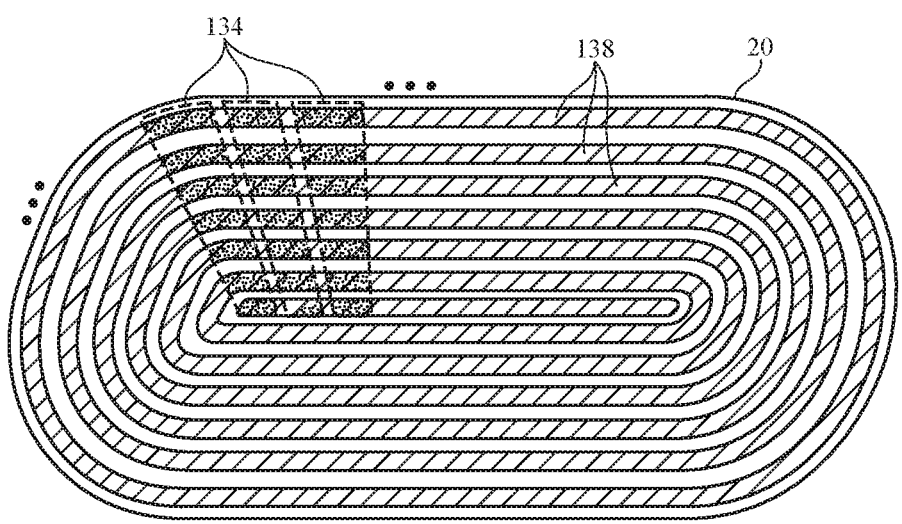
FIG. 15 is a top view of an illustrative light modulator with concentric ring-shaped electrodes and overlapping radial electrodes in accordance with an embodiment.

If desired, electrodes 132 and 138 for forming pixels 20P, 24P, and/or 22P may have a radially symmetric layout of the type shown in FIG. 15. As shown in FIG. 15, light modulator 20 (e.g., a light modulator associated with a right or left eye of a user of head-mounted device 10) or other adjustable optical component (e.g., an adjustable color filter and/or adjustable polarizer) may have a series of concentric ring-shaped electrodes 138 and a series of radially extending electrodes 134 that overlap electrodes 138. Each radially extending electrode 134 extends outwardly from the center of the light modulator or other optical device towards the outer peripheral edge of the light modulator or other optical device. Each ring electrode and each radial electrode may be individually adjusted to produce a desired pattern of light modulation (or other optical effect such as variable polarization, variable color, variable refractive index in a liquid crystal lens, etc.) across the user's field of view. If desired, the edges of electrodes 134 and 138 of FIG. 15 may have jagged edges, as described in connection with FIGS. 13 and 14.

Although sometimes described in the context of head-mounted devices, the adjustable optical components of device 10 may be incorporated into any suitable type of electronic equipment (e.g., consumer electronics devices such as handsets, tablets, headsets/glasses, etc., stationary devices such as televisions, store-front displays, etc., head-up displays in cockpits and other locations). Light modulation, optical coloration, variable polarization, and/or other optical effects may be implemented using devices that are interposed between a viewer's eyes and real-world objects and/or virtual effects such as these can be implemented by using control circuitry 50 to supply variable amounts of light modulation, color casting, etc. by processing regions in an image of a real-world object that has been captured with front-facing camera 64 before presenting those regions of the image to the user with display 26.

Pupil size measured with gaze-tracking camera 62 may be used in adjusting an adjustable optical component (e.g., a light modulator, adjustable color filter, adjustable polarizer, etc.). In dark environments, when a user's pupils are larger, near-eye features become less noticeable, whereas in bright environments, when a user's pupils are smaller, near-eye features become more noticeable. Accordingly, control circuitry 50 can adjust the optical component to produce more gradual changes in an optical parameter (e.g., light intensity, color, polarization strength) in response to detection of a bright environment or measurement of small pupil size and can make less gradual changes in the optical parameter in response to detection of a dark environment or measurement of a large pupil size.

As described in connection with FIGS. 6 and 7, user's field of view 90 may be divided into regions 92 and 94. Region 92 may be more transparent than region 94. For example, region 92 may be a transparent layer that exhibits a light transmission of at least 80%, at least 90%, or other suitable amount. Region 94 may be more opaque than region 92. For example, region 94 may be an opaque region that exhibits a light transmission of less than 20%, less than 10%, or other suitable amount.

Figure 16:
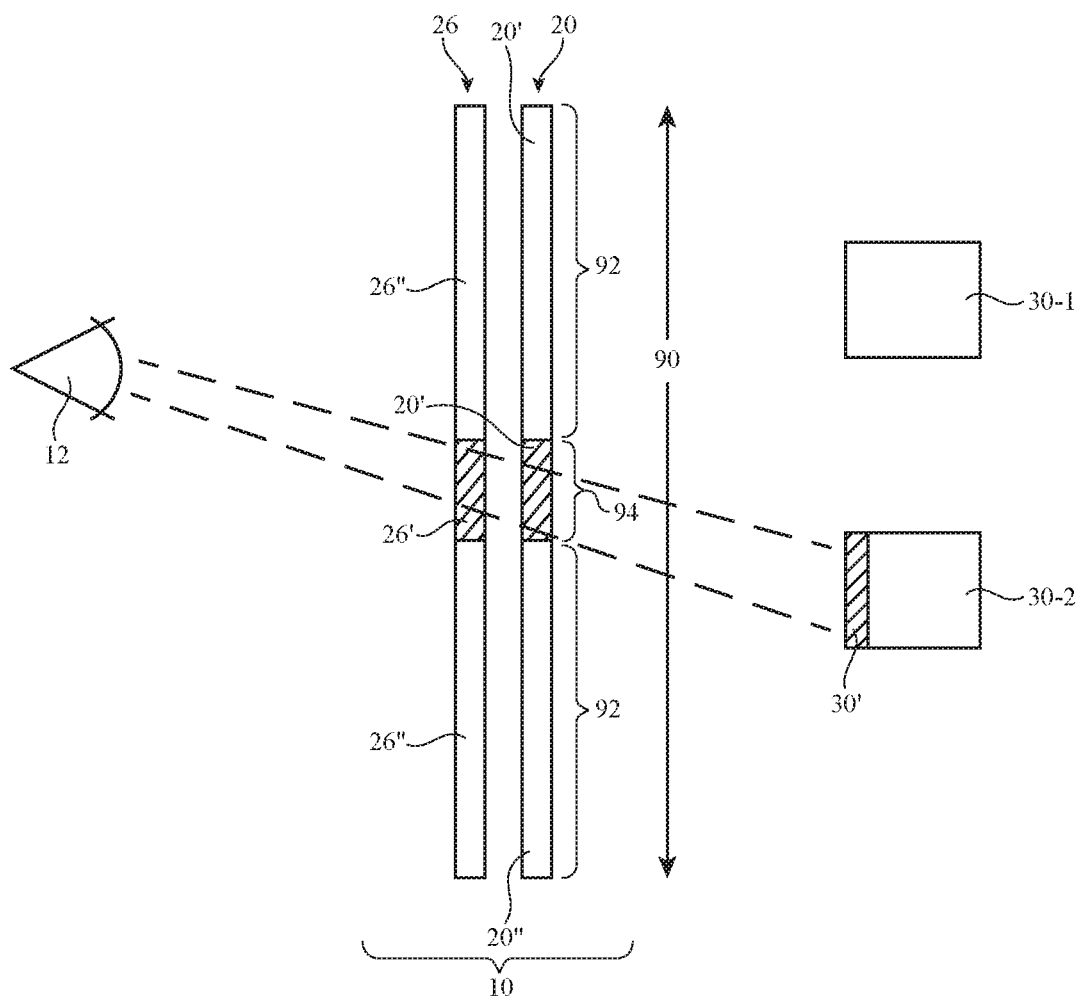
FIG. 16 is a diagram showing how a light modulator may create a darkened region in a user's field of view that is overlaid with computer-generated content in accordance with an embodiment.

FIG. 16 is a diagram showing how a light modulator may create a darkened region in a user's field of view 90. In the example of FIG. 16, user 12 is viewing objects through the optical components of device 10 such as light modulator 20 and display 26. Portion 20″ of light modulator 20 and portion 26″ of display 26 correspond to transparent region 92. In portion 20″ of light modulator 20, light modulator pixels 20P are transparent. In portion 26″ of display 26, display pixels 26P are transparent. For example, the pixels of display 26 in portion 26″ of display 26 may be in a clear state and may not be emitting any image light. As a result of the presence of transparent portions 26″ and 20‴, user 12 can view real-world objects such as real-world object 30-1 through transparent region 92.

In region 94, light modulator pixels 20P of light modulator portion 20P′ are darkened. Display pixels 26P in portion 26′ of display 26 overlap region 94 and may be used to display computer-generated images (e.g., mixed reality content). Light modulator pixels 20P in portion 20′ of light modulator 20 exhibit low light transmission (e.g., these pixels are opaque) to create darkened region 94. The presence of darkened region 94 helps block real-world objects such as object 30-2 from view by user 12 so that computer-generated content 30′ can be overlaid over object 30-2 in region 94 without becoming washed out due to background light from object 30-2 (e.g., region 94 helps make augmented image content 30′ appear solid). Content 30′ (which may sometimes be referred to as virtual reality content, mixed reality content, augmented reality content, and/or computer-generated content) may include text or moving and/or still images (icons, photographs, computer-generated objects that appear to be real-world object, game characters and other game objects, etc.).

The region of the user's field of view that is occupied by object 30-2 may be measured by camera 64. The information captured by camera 64 (e.g., the measured size of the surface of object 30-2 that faces the user) may be used in appropriately sizing the image displayed over object 30-2. For example, control circuitry 50 can use information on the shape of object 30-2 to determine the shape of overlapping image 30′. With one illustrative configuration, image 30′ may overlap object 30-2 without extending past the borders of object 30-2. If, as an example, object 30-2 is a rectangular billboard that is being viewed at an oblique angle (and that therefore occupies a trapezoidal region within the user's field of view), image 30′ (and darkened region 94 behind image 30′) may be provided with a mating trapezoidal shape. Image 30′ need not have a rectangular boundary, but rather may have an outline that follows an irregular shape determined by the shape of real-world objects measured with camera 64 and/or determined by the shape of the computer-generated game character or other computer-generated object that is associated with image 30′.

Figure 17:
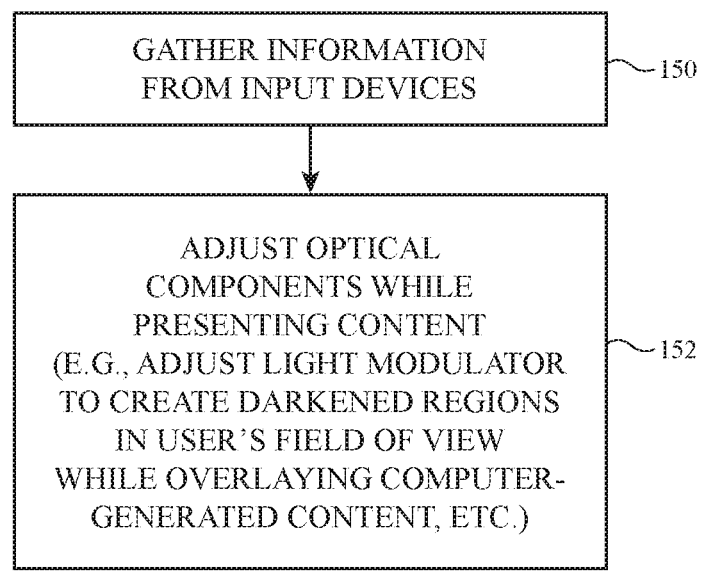
FIG. 17 is a flow chart of illustrative operations involved in using a device to present a user with content in a system in accordance with an embodiment.

Illustrative operations associated with using device 10 in system 8 are shown in FIG. 17. As shown in FIG. 17, device 10 may, during the operations of block 150, gather information from components in input-output circuitry 52 such as input-output devices 60. As an example, control circuitry 50 may use a gaze tracking system based on camera 62 to gather information on the user's current point of gaze (i.e., the direction in which the user is looking). Control circuitry 50 may use front-facing camera 64 to capture images of the real world environment surrounding user 12 (e.g., images of real-world objects in front of the user and otherwise in the user's field of view). Control circuitry 50 may use position and motion sensors 66 (e.g., an orientation sensor based on an accelerometer, gyroscope, and/or compass) to determine the orientation of device 10 relative to Earth and/or other motion and position information associated with device 10. Light detectors 68 and other sensors 70 may also be used by control circuitry 50 to gather information from user 12 and/or the environment in which device 10 is being used.

Based on the information obtained during operations such as the operations of block 150, device 10 (e.g., control circuitry 50) can take suitable action during the operations of block 152. As an example, the components in input-output circuitry 52 can be adjusted based on the information gathered during block 150 and/or other information. If, as an example, it is desired to present a user with mixed reality content, darkened region 94 may be produced within the user's field of view 90 by darkening pixels 20P of portion 20′ of light modulator 20 and computer-generated images such as image 30′ of FIG. 16 may be overlaid over region 94. Other portions of the optical components in the user's field of view may be made transparent (e.g., to create transparent region 92).

The shape of darkened region 94 and the corresponding outline of image 30′ may match (e.g., so that darkened region 94 helps block out any portions of the real-world that lie behind image 30′). The shape of darkened region 94 and image 30′ may be determined based on the shape of real-world objects (e.g., geometrical shapes measured by camera 64 during the operations of block 150) and/or may be determined based on the outlines of game characters and other computer-generated objects that are being displayed in image 30′. For example, if image 30′ corresponds to a computer-generated image of a person, region 94 may have a shape that corresponds to the outline of the person. As another example, if camera 64 detected a triangular area in the user's field of view onto which it is desired to overlay image 30′, region 94 and image 30′ may be provide with matching triangular shapes.

In general, any suitable changes may be created in one or more pixels of components such as components 20, 22, 24, and 26 in the user's field of view. Optical characteristics of device 10 such as light transmission (e.g., the amount of light transmitted through various regions of light modulator 20), light polarization (e.g., the transmission of light of different polarizations through various regions of polarizer 22), and/or color (e.g., color imparted by various regions of adjustable color filter 24) may be adjusted. At the same time, images may be produced in one or more portions of display 26.

The foregoing is merely illustrative and various modifications can be made to the described embodiments. The foregoing embodiments may be implemented individually or in any combination.

What is claimed is:

1. An electronic device, comprising:
a support structure;
a component configured to measure a color of ambient light surrounding the support structure;
a display supported by the support structure that is configured to display images;
an adjustable optical component supported by the support structure, wherein the adjustable optical component comprises an adjustable optical component selected from a group consisting of: a light modulator, an adjustable color filter, and an adjustable polarizer; and
control circuitry configured to adjust the adjustable optical component based on the color of the ambient light.

2. The electronic device defined in claim 1 wherein the adjustable optical component is configured to make gradual spatial adjustments to an optical parameter and wherein the optical parameter comprises an optical parameter selected from the group consisting of light intensity, light color, and light polarization.

3. The electronic device defined in claim 2 wherein the adjustable optical component has pixels that are not resolvable by a user's naked eye.

4. The electronic device defined in claim 2 wherein the adjustable optical component has pixel electrodes with non-straight edges.

5. The electronic device defined in claim 4 wherein the non-straight edges comprise jagged edges.

6. The electronic device defined in claim 2 wherein the gradual spatial adjustments are characterized by an amount of gradualness and wherein the control circuitry is configured to adjust the amount of gradualness based on a selected one of: pupil size and ambient light level.

7. The electronic device defined in claim 6 further comprising a gaze detection camera configured to measure the pupil size.

8. The electronic device defined in claim 6 further comprising an ambient light sensor configured to measure the ambient light level.

9. The electronic device defined in claim 1 wherein the adjustable optical component has ring-shaped electrodes and radial electrodes that each overlap a plurality of the ring-shaped electrodes.

10. The electronic device defined in claim 1 wherein the adjustable optical component comprises a light modulator.

11. The electronic device defined in claim 1 wherein the adjustable optical component comprises an adjustable color filter.

12. The electronic device defined in claim 1 wherein the adjustable optical component comprises an adjustable polarizer.

13. The electronic device defined in claim 1 wherein the support structure comprises a head-mounted support structure.

14. An electronic device, comprising:
 a transparent display configured to display an image;
 an adjustable light filter that overlaps the transparent display, wherein a real-world object is viewable through the transparent display and the adjustable light filter; and
 control circuitry configured to adjust the adjustable light filter to impart a color cast to the real-world object to match a white balance of the image on the display.

* * * * *